(12) United States Patent
Douglas et al.

(10) Patent No.: US 10,482,475 B2
(45) Date of Patent: Nov. 19, 2019

(54) SYSTEMS AND METHODS FOR PROVIDING TARGETED ADVERTISING

(75) Inventors: Christopher Dacoglu Douglas, Seattle, WA (US); Maxwell M. Steckler, Sammamish, WA (US); Robert Edward Dominy, Danville, CA (US)

(73) Assignee: ADP DEALER SERVICES, INC., Seattle, WA (US)

( * ) Notice: Subject to any disclaimer, the term of this patent is extended or adjusted under 35 U.S.C. 154(b) by 392 days.

(21) Appl. No.: 13/025,019

(22) Filed: Feb. 10, 2011

(65) Prior Publication Data

US 2012/0209714 A1 Aug. 16, 2012

(51) Int. Cl.
*G06Q 30/02* (2012.01)

(52) U.S. Cl.
CPC .................................. *G06Q 30/02* (2013.01)

(58) Field of Classification Search
USPC ............................................................ 705/14
See application file for complete search history.

(56) References Cited

U.S. PATENT DOCUMENTS

| | | |
|---|---|---|
| 3,792,445 A | 2/1974 | Bucks et al. |
| 4,258,421 A | 3/1981 | Juhasz et al. |
| 4,992,940 A | 2/1991 | Dworkin |
| 5,003,476 A | 3/1991 | Abe |
| 5,034,889 A | 7/1991 | Abe |
| 5,058,044 A | 10/1991 | Stewart et al. |
| 5,421,015 A | 5/1995 | Khoyi et al. |
| 5,442,553 A | 8/1995 | Parrillo |
| 5,452,446 A | 9/1995 | Johnson |
| 5,521,815 A | 5/1996 | Rose, Jr. |
| 5,649,186 A | 7/1997 | Ferguson |

(Continued)

FOREIGN PATENT DOCUMENTS

| | | |
|---|---|---|
| CA | 2494350 | 5/2004 |
| EP | 0461888 | 3/1995 |

OTHER PUBLICATIONS

Final Office Action dated Jul. 6, 2011, in U.S. Appl. No. 11/350,795, filed Jan. 24, 2003, 26 pgs.

(Continued)

*Primary Examiner* — John Van Bramer
*Assistant Examiner* — Darnell A Pouncil
(74) *Attorney, Agent, or Firm* — Stoel Rives LLP

(57) ABSTRACT

An advertising provider may be obligated to ensure that its advertising directs users to the correct business entity (e.g., dealer or franchise). The advertising provider may maintain a datastructure comprising a plurality of "areas of responsibility" (AOR), each of which may be assigned to a respective dealer. When generating advertising content to be provided to a user, the advertising provider may access location-identifying information about the user. The location-identifying information may comprise a zip code, street address, or the like, which is sufficiently specific to allow the advertising provider to identify an AOR in the AOR datastructure. Accordingly, generalized location information, such as city, state, and/or country may not be sufficient. The location-identifying information may be used to identify the dealer that is assigned to the user. The advertising provider may access dealer-specific information, which may be used to generate dealer-targeted advertising for the user.

20 Claims, 4 Drawing Sheets

(56) References Cited

U.S. PATENT DOCUMENTS

| | | |
|---|---|---|
| 5,694,595 A | 12/1997 | Jacobs et al. |
| 5,729,452 A | 3/1998 | Smith et al. |
| 5,787,177 A | 7/1998 | Leppek |
| 5,790,785 A | 8/1998 | Klug et al. |
| 5,835,712 A | 11/1998 | DuFresne |
| 5,845,299 A | 12/1998 | Arora et al. |
| 5,862,346 A | 1/1999 | Kley et al. |
| 5,911,145 A | 6/1999 | Arora et al. |
| 5,956,720 A | 9/1999 | Fernandez et al. |
| 5,974,149 A | 10/1999 | Leppek |
| 5,974,418 A | 10/1999 | Blinn et al. |
| 5,974,428 A | 10/1999 | Gerard et al. |
| 5,978,776 A | 11/1999 | Seretti et al. |
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | LeMole et al. |
| 6,018,748 A | 1/2000 | Smith |
| 6,021,416 A | 2/2000 | Dauerer et al. |
| 6,021,426 A | 2/2000 | Douglis et al. |
| 6,026,433 A | 2/2000 | D'Arlach et al. |
| 6,041,310 A | 3/2000 | Green et al. |
| 6,041,344 A | 3/2000 | Bodamer et al. |
| 6,055,541 A | 4/2000 | Solecki et al. |
| 6,061,698 A | 5/2000 | Chadha et al. |
| 6,067,559 A | 5/2000 | Allard et al. |
| 6,070,164 A | 5/2000 | Vagnozzi |
| 6,134,532 A | 10/2000 | Lazarus et al. |
| 6,151,609 A | 11/2000 | Truong |
| 6,178,432 B1 | 1/2001 | Cook et al. |
| 6,181,994 B1 | 1/2001 | Colson et al. |
| 6,185,614 B1 | 2/2001 | Cuomo et al. |
| 6,189,104 B1 | 2/2001 | Leppek |
| 6,219,667 B1 | 4/2001 | Lu et al. |
| 6,236,994 B1 | 5/2001 | Schwartz et al. |
| 6,263,268 B1 | 7/2001 | Nathanson |
| 6,289,382 B1 | 9/2001 | Bowman-Amuah |
| 6,295,061 B1 | 9/2001 | Park et al. |
| 6,330,499 B1 | 12/2001 | Chou et al. |
| 6,343,302 B1 | 1/2002 | Graham |
| 6,353,824 B1 | 3/2002 | Boguraev et al. |
| 6,374,241 B1 | 4/2002 | Lamburt et al. |
| 6,397,226 B1 | 5/2002 | Sage |
| 6,397,336 B2 | 5/2002 | Leppek |
| 6,401,103 B1 | 6/2002 | Ho et al. |
| 6,421,733 B1 | 7/2002 | Tso et al. |
| 6,473,849 B1 | 10/2002 | Keller et al. |
| 6,496,855 B1 | 12/2002 | Hunt et al. |
| 6,505,106 B1 | 1/2003 | Lawrence et al. |
| 6,505,205 B1 | 1/2003 | Kothuri et al. |
| 6,519,617 B1 | 2/2003 | Wanderski et al. |
| 6,535,879 B1 | 3/2003 | Behera |
| 6,539,370 B1 | 3/2003 | Chang et al. |
| 6,546,216 B2 | 4/2003 | Mizoguchi et al. |
| 6,553,373 B2 | 4/2003 | Boguraev et al. |
| 6,556,904 B1 | 4/2003 | Larson et al. |
| 6,564,216 B2 | 5/2003 | Waters |
| 6,571,253 B1 | 5/2003 | Thompson et al. |
| 6,581,061 B2 | 6/2003 | Graham |
| 6,583,794 B1 | 6/2003 | Wattenberg |
| 6,594,664 B1 | 7/2003 | Estrada et al. |
| 6,606,525 B1 | 8/2003 | Muthuswamy et al. |
| 6,629,148 B1 | 9/2003 | Ahmed et al. |
| 6,643,663 B1 | 11/2003 | Dabney et al. |
| 6,654,726 B1 | 11/2003 | Hanzek |
| 6,678,706 B1 | 1/2004 | Fishel |
| 6,697,825 B1 | 2/2004 | Underwood et al. |
| 6,721,747 B2 | 4/2004 | Lipkin |
| 6,728,685 B1 | 4/2004 | Ahluwalia |
| 6,738,750 B2 | 5/2004 | Stone et al. |
| 6,744,735 B1 | 6/2004 | Nakaguro |
| 6,748,305 B1 | 6/2004 | Klausner et al. |
| 6,785,864 B1 | 8/2004 | Te et al. |
| 6,795,819 B2 | 9/2004 | Wheeler et al. |
| 6,823,258 B2 | 11/2004 | Ukai et al. |
| 6,823,359 B1 | 11/2004 | Heidingsfeld |
| 6,826,594 B1 | 11/2004 | Pettersen |
| 6,847,988 B2 | 1/2005 | Toyouchi et al. |
| 6,850,823 B2 | 2/2005 | Eun et al. |
| 6,871,216 B2 | 3/2005 | Miller et al. |
| 6,894,601 B1 | 5/2005 | Grunden et al. |
| 6,901,430 B1 | 5/2005 | Smith |
| 6,917,941 B2 | 7/2005 | Wight et al. |
| 6,922,674 B1 | 7/2005 | Nelson |
| 6,944,677 B1 | 9/2005 | Zhao |
| 6,963,854 B1 | 11/2005 | Boyd et al. |
| 6,965,968 B1 | 11/2005 | Touboul |
| 6,978,273 B1 | 12/2005 | Bonneau et al. |
| 6,981,028 B1 | 12/2005 | Rawat et al. |
| 6,990,629 B1 | 1/2006 | Heaney et al. |
| 7,000,184 B2 | 2/2006 | Matveyenko et al. |
| 7,028,072 B1 | 4/2006 | Kliger et al. |
| 7,031,554 B2 | 4/2006 | Iwane |
| 7,039,704 B2 | 5/2006 | Davis et al. |
| 7,047,318 B1 * | 5/2006 | Svedloff ............. G06F 17/3089 707/E17.116 |
| 7,062,506 B2 | 6/2006 | Taylor et al. |
| 7,072,943 B2 | 7/2006 | Landesmann |
| 7,107,268 B1 | 9/2006 | Zawadzki et al. |
| 7,152,207 B1 | 12/2006 | Underwood et al. |
| 7,155,491 B1 | 12/2006 | Schultz et al. |
| 7,171,418 B2 | 1/2007 | Blessin |
| 7,197,764 B2 | 3/2007 | Cichowlas |
| 7,219,234 B1 | 5/2007 | Ashland et al. |
| 7,240,125 B2 | 7/2007 | Fleming |
| 7,246,263 B2 | 7/2007 | Skingle |
| 7,281,029 B2 | 10/2007 | Rawat |
| 7,322,007 B2 | 1/2008 | Schowtka et al. |
| 7,386,786 B2 | 6/2008 | Davis et al. |
| 7,401,289 B2 | 7/2008 | Lachhwani et al. |
| 7,433,891 B2 | 10/2008 | Haber et al. |
| 7,496,543 B1 | 2/2009 | Bamford et al. |
| 7,502,672 B1 | 3/2009 | Kolls |
| 7,536,641 B2 | 5/2009 | Rosenstein et al. |
| 7,548,985 B2 | 6/2009 | Guigui |
| 7,587,504 B2 | 9/2009 | Adams et al. |
| 7,593,925 B2 | 9/2009 | Cadiz et al. |
| 7,593,999 B2 | 9/2009 | Nathanson |
| 7,620,484 B1 | 11/2009 | Chen |
| 7,624,342 B2 | 11/2009 | Matveyenko et al. |
| 7,657,594 B2 | 2/2010 | Banga et al. |
| 7,739,007 B2 | 6/2010 | Logsdon |
| 7,747,680 B2 | 6/2010 | Ravikumar et al. |
| 7,778,841 B1 | 8/2010 | Bayer et al. |
| 7,801,945 B1 | 9/2010 | Geddes et al. |
| 7,861,309 B2 | 12/2010 | Spearman et al. |
| 7,865,409 B1 | 1/2011 | Monaghan |
| 7,870,253 B2 | 1/2011 | Muilenburg et al. |
| 8,019,501 B2 | 9/2011 | Breed |
| 8,036,788 B2 | 10/2011 | Breed |
| 8,051,159 B2 | 11/2011 | Muilenburg et al. |
| 8,055,544 B2 | 11/2011 | Ullman et al. |
| 8,209,259 B2 | 6/2012 | Graham, Jr. et al. |
| 8,212,667 B2 | 7/2012 | Petite et al. |
| 8,271,473 B2 | 9/2012 | Berg |
| 8,271,547 B2 | 9/2012 | Taylor et al. |
| 8,275,717 B2 | 9/2012 | Ullman et al. |
| 8,355,950 B2 | 1/2013 | Colson et al. |
| 8,438,310 B2 | 5/2013 | Muilenburg et al. |
| 8,521,654 B2 | 8/2013 | Ford et al. |
| 8,538,894 B2 | 9/2013 | Ullman et al. |
| 8,645,193 B2 | 2/2014 | Swinson et al. |
| 8,725,341 B2 | 5/2014 | Ogasawara |
| 8,849,689 B1 | 9/2014 | Jagannathan et al. |
| 8,886,389 B2 | 11/2014 | Edwards et al. |
| 9,165,413 B2 | 10/2015 | Jones et al. |
| 9,325,650 B2 | 4/2016 | Yalavarty et al. |
| 9,577,866 B2 | 2/2017 | Rogers et al. |
| 9,619,945 B2 | 4/2017 | Adderly et al. |
| 9,754,304 B2 | 9/2017 | Taira et al. |
| 10,032,139 B2 | 7/2018 | Adderly et al. |
| 10,083,411 B2 | 9/2018 | Kinsey et al. |
| 2001/0005831 A1 | 6/2001 | Lewin et al. |
| 2001/0037332 A1 | 11/2001 | Miller et al. |

(56) References Cited

U.S. PATENT DOCUMENTS

| | | |
|---|---|---|
| 2001/0039594 A1 | 11/2001 | Park et al. |
| 2001/0054049 A1 | 12/2001 | Maeda et al. |
| 2002/0023111 A1 | 2/2002 | Arora et al. |
| 2002/0024537 A1 | 2/2002 | Jones et al. |
| 2002/0026359 A1* | 2/2002 | Long .................. G06Q 30/02 705/14.26 |
| 2002/0032626 A1 | 3/2002 | DeWolf et al. |
| 2002/0032701 A1 | 3/2002 | Gao et al. |
| 2002/0042738 A1 | 4/2002 | Srinivasan et al. |
| 2002/0046245 A1 | 4/2002 | Hillar et al. |
| 2002/0049831 A1 | 4/2002 | Platner et al. |
| 2002/0059260 A1 | 5/2002 | Jas |
| 2002/0065698 A1 | 5/2002 | Schick et al. |
| 2002/0065739 A1 | 5/2002 | Florance et al. |
| 2002/0069110 A1 | 6/2002 | Sonnenberg |
| 2002/0073080 A1 | 6/2002 | Lipkin |
| 2002/0082978 A1 | 6/2002 | Ghouri et al. |
| 2002/0091755 A1 | 7/2002 | Narin |
| 2002/0107739 A1 | 8/2002 | Schlee |
| 2002/0111727 A1 | 8/2002 | Vanstory et al. |
| 2002/0111844 A1 | 8/2002 | Vanstory et al. |
| 2002/0116418 A1 | 8/2002 | Lachhwani et al. |
| 2002/0123359 A1* | 9/2002 | Wei et al. .................. 455/466 |
| 2002/0124053 A1 | 9/2002 | Adams et al. |
| 2002/0129054 A1 | 9/2002 | Ferguson et al. |
| 2002/0138331 A1 | 9/2002 | Hosea et al. |
| 2002/0143646 A1 | 10/2002 | Boyden et al. |
| 2002/0154146 A1 | 10/2002 | Rodriquez et al. |
| 2002/0169851 A1 | 11/2002 | Weathersby et al. |
| 2002/0196273 A1 | 12/2002 | Krause |
| 2002/0198761 A1 | 12/2002 | Ryan et al. |
| 2002/0198878 A1 | 12/2002 | Baxter et al. |
| 2003/0014443 A1 | 1/2003 | Bernstein et al. |
| 2003/0023632 A1 | 1/2003 | Ries et al. |
| 2003/0033378 A1 | 2/2003 | Needham et al. |
| 2003/0036832 A1 | 2/2003 | Kokes et al. |
| 2003/0036964 A1 | 2/2003 | Boyden et al. |
| 2003/0037263 A1 | 2/2003 | Kamat et al. |
| 2003/0046179 A1 | 3/2003 | Anabtawi et al. |
| 2003/0051022 A1 | 3/2003 | Sogabe et al. |
| 2003/0061263 A1 | 3/2003 | Riddle |
| 2003/0065532 A1 | 4/2003 | Takaoka |
| 2003/0069785 A1 | 4/2003 | Lohse |
| 2003/0069790 A1 | 4/2003 | Kane |
| 2003/0074392 A1 | 4/2003 | Campbell et al. |
| 2003/0115292 A1 | 6/2003 | Griffin et al. |
| 2003/0120502 A1 | 6/2003 | Robb et al. |
| 2003/0145310 A1 | 7/2003 | Thames et al. |
| 2003/0177050 A1 | 9/2003 | Crampton et al. |
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |
| 2004/0039646 A1 | 2/2004 | Hacker |
| 2004/0041818 A1 | 3/2004 | White et al. |
| 2004/0073546 A1 | 4/2004 | Forster et al. |
| 2004/0073564 A1 | 4/2004 | Haber et al. |
| 2004/0088228 A1 | 5/2004 | Mercer et al. |
| 2004/0117046 A1 | 6/2004 | Colle et al. |
| 2004/0128320 A1 | 7/2004 | Grove et al. |
| 2004/0139203 A1 | 7/2004 | Graham, Jr. et al. |
| 2004/0148342 A1 | 7/2004 | Cotte |
| 2004/0156020 A1 | 8/2004 | Edwards |
| 2004/0163047 A1 | 8/2004 | Nagahara et al. |
| 2004/0181464 A1 | 9/2004 | Vanker et al. |
| 2004/0199413 A1 | 10/2004 | Hauser et al. |
| 2004/0220863 A1 | 11/2004 | Porter et al. |
| 2004/0225664 A1 | 11/2004 | Casement |
| 2004/0230897 A1 | 11/2004 | Latzel |
| 2004/0255233 A1 | 12/2004 | Croney et al. |
| 2004/0267263 A1 | 12/2004 | May |
| 2004/0268225 A1 | 12/2004 | Walsh et al. |
| 2004/0268232 A1 | 12/2004 | Tunning |
| 2005/0015491 A1 | 1/2005 | Koeppel |
| 2005/0065804 A1 | 3/2005 | Worsham et al. |
| 2005/0108112 A1 | 5/2005 | Ellenson et al. |
| 2005/0114270 A1 | 5/2005 | Hind et al. |
| 2005/0114764 A1 | 5/2005 | Gudenkauf et al. |
| 2005/0108637 A1 | 6/2005 | Sahota et al. |
| 2005/0171836 A1 | 8/2005 | Leacy |
| 2005/0187834 A1 | 8/2005 | Painter et al. |
| 2005/0228736 A1* | 10/2005 | Norman ................. G06Q 30/08 705/37 |
| 2005/0268282 A1 | 12/2005 | Laird |
| 2005/0289020 A1 | 12/2005 | Bruns et al. |
| 2005/0289599 A1 | 12/2005 | Matsuura et al. |
| 2006/0031811 A1 | 2/2006 | Ernst et al. |
| 2006/0059253 A1 | 3/2006 | Goodman et al. |
| 2006/0064637 A1 | 3/2006 | Rechterman et al. |
| 2006/0123330 A1 | 6/2006 | Horiuchi et al. |
| 2006/0129423 A1 | 6/2006 | Sheinson et al. |
| 2006/0129982 A1 | 6/2006 | Doyle |
| 2006/0136105 A1 | 6/2006 | Larson |
| 2006/0161841 A1 | 7/2006 | Horiuchi et al. |
| 2006/0200751 A1 | 9/2006 | Underwood et al. |
| 2006/0248442 A1 | 11/2006 | Rosenstein et al. |
| 2006/0265355 A1 | 11/2006 | Taylor |
| 2006/0271844 A1 | 11/2006 | Suklikar |
| 2006/0277588 A1 | 12/2006 | Harrington et al. |
| 2007/0005446 A1 | 1/2007 | Fusz et al. |
| 2007/0016486 A1 | 1/2007 | Stone et al. |
| 2007/0033520 A1 | 2/2007 | Kimzey et al. |
| 2007/0053513 A1 | 3/2007 | Hoffberg |
| 2007/0100519 A1 | 5/2007 | Engel |
| 2007/0150368 A1 | 6/2007 | Arora et al. |
| 2007/0209011 A1 | 9/2007 | Padmanabhuni et al. |
| 2007/0250327 A1 | 10/2007 | Hedy |
| 2007/0271154 A1 | 11/2007 | Broudy et al. |
| 2007/0271330 A1 | 11/2007 | Mattox et al. |
| 2007/0271389 A1 | 11/2007 | Joshi et al. |
| 2007/0282711 A1 | 12/2007 | Ullman et al. |
| 2007/0282712 A1 | 12/2007 | Ullman et al. |
| 2007/0282713 A1 | 12/2007 | Ullman et al. |
| 2007/0288413 A1 | 12/2007 | Mizuno et al. |
| 2008/0015929 A1 | 1/2008 | Koeppel et al. |
| 2008/0027827 A1 | 1/2008 | Eglen et al. |
| 2008/0172632 A1 | 7/2008 | Stambaugh |
| 2008/0189143 A1 | 8/2008 | Wurster |
| 2008/0195435 A1 | 8/2008 | Bentley et al. |
| 2008/0195932 A1 | 8/2008 | Oikawa et al. |
| 2008/0201163 A1 | 8/2008 | Barker et al. |
| 2009/0012887 A1 | 1/2009 | Taub et al. |
| 2009/0024918 A1 | 1/2009 | Silverbrook et al. |
| 2009/0043780 A1 | 2/2009 | Hentrich, Jr. et al. |
| 2009/0070435 A1 | 3/2009 | Abhyanker |
| 2009/0089134 A1 | 4/2009 | Uyeki |
| 2009/0106036 A1 | 4/2009 | Tamura et al. |
| 2009/0112687 A1* | 4/2009 | Blair et al. .................. 705/10 |
| 2009/0182232 A1 | 7/2009 | Zhang et al. |
| 2009/0204454 A1 | 8/2009 | Lagudi |
| 2009/0222532 A1 | 9/2009 | Finlaw |
| 2009/0265607 A1 | 10/2009 | Raz et al. |
| 2009/0313035 A1 | 12/2009 | Esser et al. |
| 2010/0082778 A1 | 4/2010 | Muilenburg et al. |
| 2010/0082780 A1 | 4/2010 | Muilenburg et al. |
| 2010/0088158 A1 | 4/2010 | Pollack |
| 2010/0100506 A1 | 4/2010 | Marot |
| 2010/0293030 A1 | 11/2010 | Wu |
| 2010/0312608 A1* | 12/2010 | Shan et al. .................. 705/10 |
| 2010/0324777 A1 | 12/2010 | Tominaga et al. |
| 2011/0010432 A1 | 1/2011 | Uyeki |
| 2011/0022525 A1 | 1/2011 | Swinson et al. |
| 2011/0145064 A1 | 6/2011 | Anderson et al. |
| 2011/0161167 A1 | 6/2011 | Jallapuram |
| 2011/0191264 A1 | 8/2011 | Inghelbrecht et al. |
| 2011/0224864 A1 | 9/2011 | Gellatly et al. |
| 2012/0089474 A1 | 4/2012 | Xiao et al. |
| 2012/0209714 A1 | 8/2012 | Douglas et al. |
| 2012/0221125 A1 | 8/2012 | Bell |
| 2012/0278886 A1 | 11/2012 | Luna |
| 2013/0046432 A1 | 2/2013 | Edwards et al. |
| 2013/0080196 A1 | 3/2013 | Schroeder et al. |
| 2013/0204484 A1 | 8/2013 | Ricci |

(56) References Cited

U.S. PATENT DOCUMENTS

| | | |
|---|---|---|
| 2013/0325541 A1 | 12/2013 | Capriotti et al. |
| 2013/0332023 A1 | 12/2013 | Bertosa et al. |
| 2014/0026037 A1 | 1/2014 | Garb et al. |
| 2014/0088866 A1 | 3/2014 | Knapp et al. |
| 2014/0229391 A1 | 8/2014 | East et al. |
| 2014/0278805 A1 | 9/2014 | Thompson |
| 2014/0324275 A1 | 10/2014 | Stanek et al. |
| 2014/0379530 A1 | 12/2014 | Kim et al. |
| 2015/0057875 A1 | 2/2015 | McGinnis et al. |
| 2015/0066781 A1 | 3/2015 | Johnson et al. |
| 2015/0100199 A1 | 4/2015 | Kurnik et al. |
| 2015/0278886 A1 | 10/2015 | Fusz |
| 2015/0286979 A1 | 10/2015 | Ming et al. |
| 2016/0071054 A1 | 3/2016 | Kakarala et al. |
| 2016/0140622 A1 | 5/2016 | Wang et al. |
| 2016/0148439 A1 | 5/2016 | Akselrod et al. |
| 2017/0124525 A1 | 5/2017 | Johnson et al. |

OTHER PUBLICATIONS

Understanding X.500—The Directory. Chadwick, D.W. Available at http://sec.cs.kent.ac.uk/x500book/. 1996. Entire work cited.

Internet Archive Wayback Machine, archive of LDAP Browser. com—FAQ. Archived Dec. 11, 2000. Available at http://web.archive.org/web/200012110152/http://www.ldapbrowser.com/faq/faq.php3?sID=fe4ae66f2f023d86909f35e974f3a1ce.

Internet Archive Wayback Machine, archive of LDAP Browser. com—Product Info. Archived Dec. 11, 2000. Available at http://web.archive.org/web/200012110541/http:www.ldapbrowser.com/prodinfo/prodinfo.php3?sID=fe4ae66f2f023d86909f35e974f3a1ce.

Final Office Action for U.S. Appl. No. 14/208,042, filed Mar. 13, 2014, and dated Dec. 6, 2016, 26 pgs.

"NetFormx Offers Advanced Network Discovery Software". PR Newswire. Mar. 15, 1999. Retrieved from http://www.highbeam.com/doc/1G1-54102907.html>.

Aloisio, Giovanni et al., "Web-based access to the Grid using the Grid Resource Broker portal," Google 2002, pp. 1145-1160.

Anonymous, "Software ready for prime time." Automotive News. Detroit, Nov. 5, 2001. vol. 76, Issue 5996, p. 28.

Chen, Deren, "Business to Business Standard and Supply Chain System Framework in Virtual Enterprises," Computer Supported Cooperative Work in Design, The Sixth International Conference on, 2001; Publication Year: 2001, pp. 472-476.

CNY Business Journal, "Frank La Voila named Southern Tier Small-Business Person of 1999". Jun. 11, 1999. 2 pgs.

Dallas Morning News, "I know someone who knows Kevin Bacon". Oct. 27, 1998. 4 pgs.

Davis, Peter T. et al., "Sams Teach Yourself Microsoft Windows NT Server 4 in 21 Days," Sams® Publishing, © 1999. ISBN: 0-672-31555-6, 15 pgs., printed Dec. 21, 2008.

Derfler, Frank J. et al., "How Networks Work: Millennium Edition," Que, A Division of Macmillan Computer Publishing, © 2000. ISBN: 0-7897-2445-6, 9 pgs.

Final Office Action for U.S. Appl. No. 10/350,795, filed Jan. 24, 2003, and dated Mar. 3, 2010, 24 pgs.

Final Office Action for U.S. Appl. No. 10/350,810, filed Jan. 24, 2003, and dated Apr. 5, 2005, 12 pgs.

Final Office Action for U.S. Appl. No. 10/350,810, filed Jan. 24, 2003, and dated May 18, 2006, 15 pgs.

Final Office Action for U.S. Appl. No. 10/350,810, filed Jan. 24, 2003, and dated Nov. 14, 2007, 13 pgs.

Final Office Action for U.S. Appl. No. 10/351,465, filed Jan. 24, 2003, and dated May 5, 2005, 8 pgs.

Final Office Action for U.S. Appl. No. 11/149,909, filed Jun. 10, 2005, and dated Feb. 4, 2009, 14 pgs.

Final Office Action for U.S. Appl. No. 11/442,821, filed May 30, 2006, and dated Apr. 7, 2009, 19 pgs.

Final Office Action for U.S. Appl. No. 11/442,821, filed May 30, 2006, and dated May 21, 2010, 28 pgs.

Final Office Action for U.S. Appl. No. 11/442,821, filed May 30, 2006, and dated Nov. 29, 2011, 26 pgs.

Final Office Action for U.S. Appl. No. 11/524,602, filed Sep. 21, 2006, and dated Jul. 27, 2010, 11 pgs.

Final Office Action for U.S. Appl. No. 11/524,602, filed Sep. 21, 2006, and dated Jun. 26, 2012, 11 pgs.

Final Office Action for U.S. Appl. No. 12/243,852, filed Oct. 1, 2008, and dated Oct. 24, 2011, 13 pgs.

Final Office Action for U.S. Appl. No. 12/243,861, filed Oct. 1, 2008, and dated Jun. 22, 2011, 5 pgs.

Hogue et al., "Thresher: Automating the Unwrapping of Semantic Content from the World Wide Web," ACM 2005, pp. 86-95.

Housel, Barron C. et al., "WebExpress: A client/intercept based system for optimizing Web browsing in a wireless environment," Google 1998, pp. 419-431.

http://web.archive.org/web/20010718130244/http://chromedata.com/maing2/about/index.asp, 1 pg.

http://web.archive.org/web/20050305055408/http://www.dealerclick.com/, 1 pg.

http://web.archive.org/web/20050528073821/http://www.kbb.com/, 1 pg.

http://web.archive.org/web/20050531000823/http://www.carfax.com/, 1 pg.

IBM Tivoli Access Manager Base Administration Guide, Version 5.1. 2003, International Business Machines Corporation. Entire book enclosed and cited. 402 pgs.

Interconnection. (2003). In Roget's II The New Thesaurus. Boston, MA: Houghton Mifflin. Retrieved Jul. 16, 2009, from http://www.credoreference.com/entry/hmrogets/interconnection, 1 pg.

Internet Archive: Audio Archive, http://www.archive.org/audio/audio-searchresults.php?search=@start=0&limit=100&sort=ad, printed May 12, 2004, 12 pgs.

Internet Archive: Democracy Now, http://www.archive.org/audio/collection.php?collection=democracy_now, printed May 12, 2004, 2 pgs.

Java 2 Platform, Enterprise Edition (J2EE) Overview, printed Mar. 6, 2010, 3 pgs.

Java version history—Wikipedia, the free encyclopedia, printed Mar. 6, 2010, 9 pgs.

Michener, J.R., et al., "Managing System and Active-Content Integrity," Computer; vol. 33, Issue: 7; Publication Year: 2000, pp. 108-110.

Milic-Frayling, Natasa, et al., "SmartView: Enhanced Document Viewer for Mobile Devices," Google Nov. 15, 2002, 11 pgs.

Non-Final Office Action for U.S. Appl. No. 10/350,795, filed Jan. 24, 2003, and dated Dec. 26, 2008, 13 pgs.

Non-Final Office Action for U.S. Appl. No. 10/350,795, filed Jan. 24, 2003, and dated Feb. 6, 2006, 11 pgs.

Non-Final Office Action for U.S. Appl. No. 10/350,795, filed Jan. 24, 2003, and dated Jul. 22, 2009, 22 pgs.

Non-Final Office Action for U.S. Appl. No. 10/350,795, filed Jan. 24, 2003, and dated Jun. 29, 2006, 11 pgs.

Non-Final Office Action for U.S. Appl. No. 10/350,795, filed Jan. 24, 2003, and dated Mar. 12, 2007, 10 pgs.

Non-Final Office Action for U.S. Appl. No. 10/350,795, filed Jan. 24, 2003, and dated May 29, 2008, 10 pgs.

Non-Final Office Action for U.S. Appl. No. 10/350,795, filed Jan. 24, 2003, and dated Nov. 1, 2010, 19 pgs.

Non-Final Office Action for U.S. Appl. No. 10/350,796, filed Jan. 24, 2003 and dated May 19, 2005, 7 pgs.

Non-Final Office Action for U.S. Appl. No. 10/350,810, filed Jan. 24, 2003, and dated Apr. 17, 2007, 12 pgs.

Non-Final Office Action for U.S. Appl. No. 10/350,810, filed Jan. 24, 2003, and dated Dec. 9, 2005, 14 pgs.

Non-Final Office Action for U.S. Appl. No. 10/350,810, filed Jan. 24, 2003, and dated Sep. 22, 2004, 10 pgs.

Non-Final Office Action for U.S. Appl. No. 10/351,465, filed Jan. 24, 2003, and dated Jul. 27, 2004, 9 pgs.

Non-Final Office Action for U.S. Appl. No. 10/351,606, filed Jan. 24, 2003, and dated Dec. 19, 2005, 8 pgs.

Non-Final Office Action for U.S. Appl. No. 10/351,606, filed Jan. 24, 2003, and dated May 17, 2004, 6 pgs.

Non-Final Office Action for U.S. Appl. No. 11/149,909, filed Jun. 10, 2005, and dated May 13, 2008, 14 pgs.

(56) References Cited

OTHER PUBLICATIONS

Non-Final Office Action for U.S. Appl. No. 11/149,909, filed Jun. 10, 2005, and dated May 6, 2009, 6 pgs.
Non-Final Office Action for U.S. Appl. No. 11/414,939, filed May 1, 2006, and dated Jul. 19, 2010, 7 pgs.
Non-Final Office Action for U.S. Appl. No. 11/414,939, filed May 1, 2006, and dated Mar. 9, 2010, 11 pgs.
Non-Final Office Action for U.S. Appl. No. 11/442,821, filed May 30, 2006, and dated Jun. 1, 2011, 23 pgs.
Non-Final Office Action for U.S. Appl. No. 11/442,821, filed May 30, 2006, and dated Nov. 12, 2009, 19 pgs.
Non-Final Office Action for U.S. Appl. No. 11/442,821, filed May 30, 2006, and dated Sep. 3, 2008, 14 pgs.
Non-Final Office Action for U.S. Appl. No. 11/524,602, filed Sep. 21, 2006, and dated Nov. 14, 2011, 19 pgs.
Non-Final Office Action for U.S. Appl. No. 11/525,009, filed Sep. 21, 2006, and dated Aug. 10, 2011, 18 pgs.
Non-Final Office Action for U.S. Appl. No. 11/525,009, filed Sep. 21, 2006, and dated Dec. 16, 2009, 20 pgs.
Non-Final Office Action for U.S. Appl. No. 12/243,852, filed Oct. 1, 2008, and dated Jan. 16, 2013, 5 pgs.
Non-Final Office Action for U.S. Appl. No. 14/208,042, filed Mar. 13, 2014, and dated Jun. 30, 2016, 23 pgs.
Notice of Allowance and Fee(s) Due for U.S. Appl. No. 10/350,795, filed Jan. 24, 2003, and dated May 7, 2012, 15 pgs.
Notice of Allowance and Fee(s) Due for U.S. Appl. No. 10/350,796, filed Jan. 24, 2003 and dated Feb. 1, 2006, 5 pgs.
Notice of Allowance and Fee(s) Due for U.S. Appl. No. 10/350,810, filed Jan. 24, 2003, and dated Apr. 14, 2008, 6 pgs.
Notice of Allowance and Fee(s) Due for U.S. Appl. No. 10/351,465, filed Jan. 24, 2003, and dated Sep. 21, 2005, 4 pgs.
Notice of Allowance and Fee(s) Due for U.S. Appl. No. 10/351,606, filed Jan. 24, 2003 and dated Apr. 4, 2006, 8 pgs.
Notice of Allowance and Fee(s) Due for U.S. Appl. No. 10/351,606, filed Jan. 24, 2003, and dated Apr. 4, 2006, 12 pgs.
Notice of Allowance and Fee(s) Due for U.S. Appl. No. 11/149,909, filed Jun. 10, 2005, and dated Sep. 16, 2009, 7 pgs.
Notice of Allowance and Fee(s) Due for U.S. Appl. No. 11/414,939, filed May 1, 2006, and dated Nov. 2, 2010, pgs.
Notice of Allowance and Fee(s) Due for U.S. Appl. No. 11/442,821, filed May 30, 2006, and dated Jul. 30, 2012, 6 pgs.
Notice of Allowance and Fee(s) Due for U.S. Appl. No. 11/446,011, filed Jun. 2, 2006, and dated Aug. 9, 2011, 10 pgs.
Notice of Allowance and Fee(s) Due for U.S. Appl. No. 11/524,602, filed Sep. 21, 2006, and dated Aug. 6, 2013, 22 pgs.
Notice of Allowance and Fee(s) Due for U.S. Appl. No. 11/525,009, filed Sep. 21, 2006, and dated Jul. 23, 2012, 19 pgs.
Notice of Allowance and Fee(s) Due for U.S. Appl. No. 12/243,852, filed Oct. 1, 2008, and dated Feb. 27, 2013, 6 pgs.
Notice of Allowance and Fee(s) Due for U.S. Appl. No. 12/243,855, filed Oct. 1, 2008, and dated Oct. 28, 2010, 5 pgs.
Notice of Allowance and Fee(s) Due for U.S. Appl. No. 12/243,861, filed Oct. 1, 2008, and dated Sep. 6, 2011, 10 pgs.
Notice of Non-compliant Amendment dated Dec. 12, 2006 in U.S. Appl. No. 10/350,810.
Permissions in the Java™ 2 SDK, printed Mar. 6, 2010, 45 pgs.
Restriction Requirement for U.S. Appl. No. 12/243,852, filed Oct. 1, 2008, and dated Dec. 7, 2010.
Strebe, Matthew et al. MCSE: NT Server 4 Study Guide, Third Edition. 2000, SYBEX Inc. Front matter, pp. 284-293, and 308-347 are included. Entire book cited, 36 pgs.
Supplemental Notice of Allowability for U.S. Appl. No. 12/243,852, filed Oct. 1, 2008, and dated Mar. 19, 2013, 3 pgs.
Trademark Electronic Search System record for Serial No. 76375405, Word Mark "NITRA".
Lee, Adam J. et al., "Searching for Open Windows and Unlocked Doors: Port Scanning in Large-Scale Commodity Clusters," Cluster Computing and the Grid, 2005. CCGrid 2005. IEEE International Symposium on vol. 1; Publication Year: 2005,, pp. 146-151 vol. 1.
Advisory Action for U.S. Appl. No. 15/602,999, filed May 23, 2017, and dated Jan. 31, 2019, 3 pgs.
Non-Final Office Action for U.S. Appl. No. 15/134,779, filed Apr. 21, 2016, and dated Jan. 30, 2019, 26 pgs.
Non-Final Office Action received in U.S. Appl. No. 15/134,793, filed Apr. 21, 2016, dated Jan. 30, 2019, 26 pgs.
"An Appointment with Destiny—The Time for Web-Enabled Scheduling has Arrived", Link Fall, 2007, 2 pages.
"How a Solution found a Problem of Scheduling Service Appointments", Automotive News, 2016, 4 pages.
"Service Advisor", Automotive Dealership Institute, 2007, 26 pages.
"XTime.com Web Pages", Jan. 8, 2015, 1 page.
"XTimes Newsletter", vol. 7, 2013, 4 pages.
U.S. Appl. No. 15/134,820, Notice of Allowance, dated Jan. 28, 2019, 7 pages.
Croswell, "Service Shop Optimiztion", Modern Tire Retailer, May 21, 2013, 7 pages.
Emmanuel, "Basics to Creating an Appointment System for Automotive Service Customers", Automotiveservicemanagement.com, 2006, 9 pages.
U.S. Appl. No. 15/602,999, Notice of Allowance, dated Apr. 18, 2019, 6 pages.
Office Action dated Sep. 17, 2007 in U.S. Appl. No. 10/665,899, filed Sep. 18, 2003.
Office Action dated Jul. 7, 2008 in U.S. Appl. No. 10/665,899, filed Sep. 18, 2003.
Office Action dated Nov. 13, 2008 in U.S. Appl. No. 10/665,899, filed Sep. 18, 2003.
Office Action dated May 11, 2009 in U.S. Appl. No. 10/665,899, filed Sep. 18, 2003.
Office Action dated Sep. 14, 2009 in U.S. Appl. No. 10/665,899, filed Sep. 18, 2003.
Office Action dated Nov. 27, 2009 in U.S. Appl. No. 11/446,011, filed Jun. 2, 2006.
Office Action dated Dec. 11, 2009 in U.S. Appl. No. 11/524,602, filed Sep. 21, 2006.
Office Action dated Dec. 16, 2009 in U.S. Appl. No. 11/525,009, filed Sep. 21, 2006.
Office Action dated Feb. 24, 2010 in U.S. Appl. No. 10/665,899, filed Sep. 18, 2003.
Office Action dated Jun. 8, 2010 in U.S. Appl. No. 11/446,011, filed Jun. 2, 2006.
Office Action dated Jul. 27, 2010 in U.S. Appl. No. 11/524,602, filed Sep. 21, 2006.
Office Action dated Aug. 4, 2010 in U.S. Appl. No. 11/525,009, filed Sep. 21, 2006.
Office Action dated Aug. 30, 2010 in U.S. Appl. No. 10/665,899, filed Sep. 18, 2003.
Office Action dated Oct. 14, 2010 in U.S. Appl. No. 12/243,855, filed Oct. 1, 2008.
Office Action dated Nov. 8, 2010 in U.S. Appl. No. 12/243,861, filed Oct. 1, 2008.
Notice of Allowance dated Nov. 22, 2010 in U.S. Appl. No. 12/243,855, filed Oct. 1, 2008.
Office Action dated Mar. 1, 2011 in U.S. Appl. No. 11/446,011, filed Jun. 2, 2006.
Office Action dated Mar. 8, 2011 in U.S. Appl. No. 10/665,899, filed Sep. 18, 2003.
Office Action dated Mar. 17, 2011 in U.S. Appl. No. 12/243,852, filed Oct. 1, 2008.
U.S. Appl. No. 15/134,779, Advisory Action, dated Jul. 29, 2019, 6 pages.
U.S. Appl. No. 15/134,793, Advisory Action, dated Jul. 29, 2019, 6 pages.
Advisory Action for U.S. Appl. No. 14/208,042, filed Mar. 13, 2014, and dated Jul. 12, 2018.
Final Office Action for U.S. Appl. No. 14/208,042, filed Mar. 13, 2014, and dated Jan. 11, 2019 , 16 pgs.
Final Office Action for U.S. Appl. No. 14/208,042, filed Mar. 13, 2014, and dated Apr. 16, 2018.
Trademark Application, Serial No. 76375405. 13 pages of advertising material and other application papers enclosed.

(56) References Cited

OTHER PUBLICATIONS

Non-Final Office Action for U.S. Appl. No. 14/208,042, filed Mar. 13, 2014, and dated Sep. 20, 2017.
Non-Final Office Action for U.S. Appl. No. 14/208,042, filed Mar. 13, 2014, and dated Sep. 21, 2018.
Non-Final Office Action for U.S. Appl. No. 15/602,999, filed May 23, 2017, and dated May 3, 2018.
Non-Final Office Action dated Oct. 6, 2017 in U.S. Appl. No. 13/025,019.
Internet Archive Dan Gillmor Sep. 1, 1996.
"Openbay Announces First-of-its-Kind Connected Car Repair Service", openbay.com, Mar. 31, 2015, 14 pages.
U.S. Appl. No. 15/134,779, Final Office Action, dated May 17, 2019, 25 pages.
Chatterjee, et al., "On-board diagnostics not just for racing anymore", EDN.com, May 6, 2013, 7 pages.
Drawbaugh, "Automatic Link Review: an expensive way to learn better driving habits", Endgadget.com, Nov. 26, 2013, 14 pages.
Jenkins, "Real-time vehicle performance monitoring with data intergrity", A Thesis Submitted to the Faculty of Mississippi State University, Oct. 2006, 57 pages.
Lavrinc, "First Android-powered infotainment system coming to 2012 Saab 9-3", Autoblog.com, Mar. 2, 2011, 8 pages.
Needham, "Google Now Taking Appointments for Auto Repair Shops", Autoshopsolutions.com, Aug. 25, 2015, 6 pages.
openbay.com Web Pages, Openbay.com, retrieved from archive.org May 14, 2019, Apr. 2015, 6 pages.
openbay.com Web Pages, Openbay.com, retrieved from archive.org on May 14, 2019, Feb. 2014, 2 pages.
openbay.com Web Pages, Openbay.com, retrieved from archive.org, May 14, 2019, Mar. 2015, 11 pages.
Phelan, "Smart phone app aims to automate car repairs", Detroit Free Press Auto Critic, Mar. 31, 2015, 2 pages.
Pubnub Staff, "Streaming Vehicle Data in Realtime with Automatic (Pt 1)", Pubnub.com, Aug. 17, 2015, 13 pages.
Warren, "This Device Determines What Ails Your Car and Finds a Repair Shop—Automatically", CarAndDriver.com, Apr. 8, 2015, 7 pages.
You, et al., "Overview of Remote Diagnosis and Maintenance for Automotive Systems", 2005 SAE World Congress, Apr. 11-14, 2015, 10 pages.
U.S. Appl. No. 15/134,793, Final Office Action, dated May 13, 2019, 26 pages.

* cited by examiner

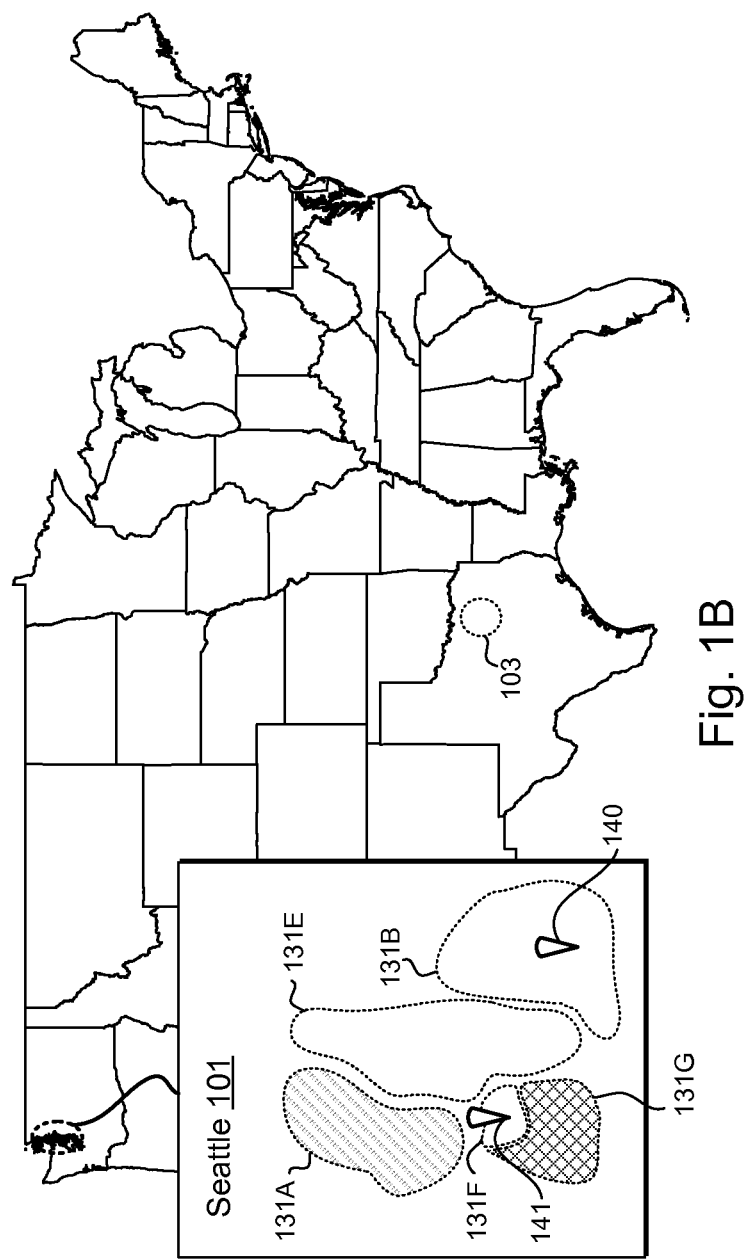

SYSTEMS AND METHODS FOR PROVIDING TARGETED ADVERTISING

TECHNICAL FIELD

This disclosure relates to providing targeted advertising and, in particular, to providing location-aware targeted advertising that conforms to a predefined area of responsibility.

BRIEF DESCRIPTION OF THE DRAWINGS

FIG. 1B is a graphical depiction of an area of responsibility datastructure;

Figure 1A:
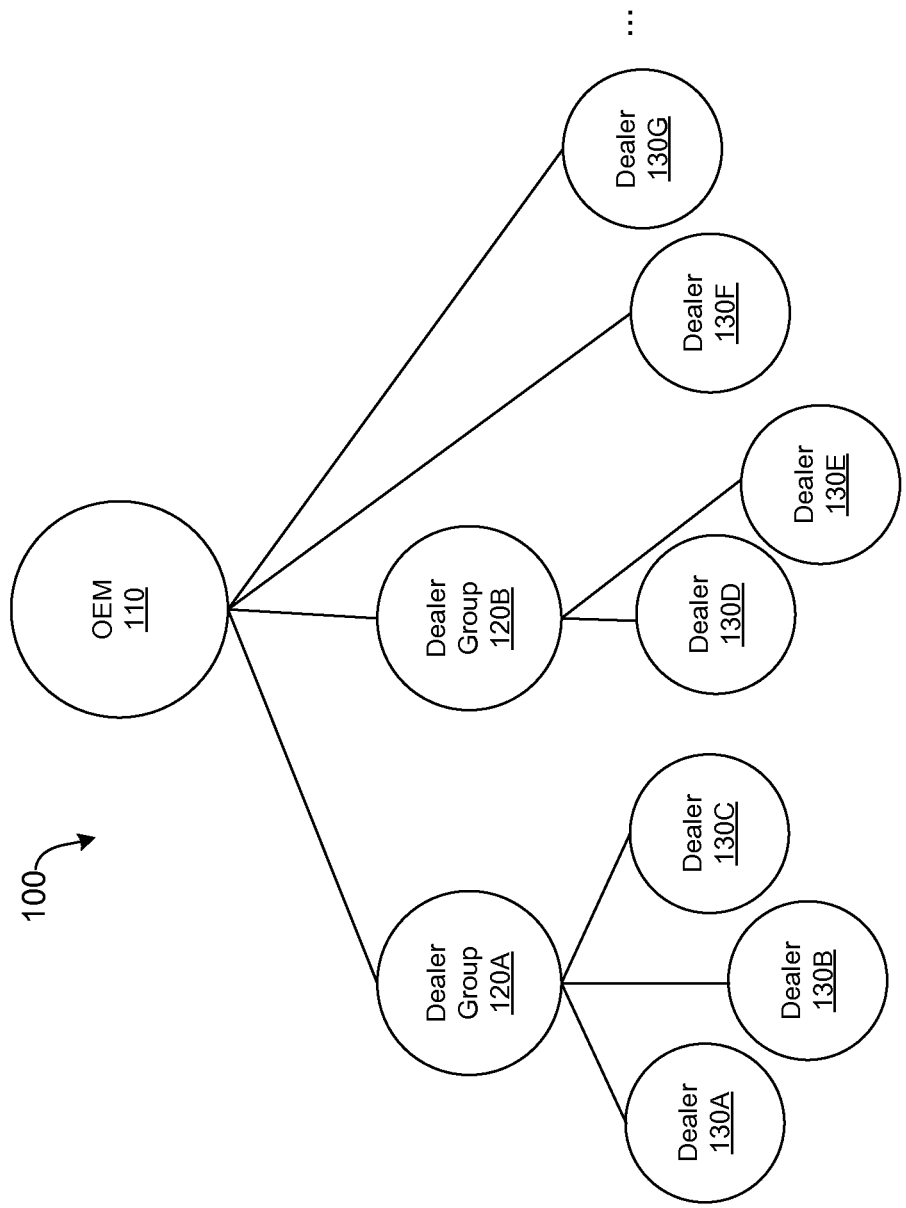
FIG. 1A depicts an exemplary business organization.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Network-accessible services, such as websites, network-enabled applications, and the like, have become important marketing tools and/or sales fronts for a wide variety of products and/or services. As used herein, a "network-accessible service" refers to any service that is capable of and/or configured to interact with users via a communication network. A network-accessible service may be configured to provide and/or receive content from users via the communication network. The content may include, but is not limited to: text, images, video, multi-media, executable code, markup (e.g., Hypertext Markup Language (HTML)), interface components, executable and/or interpretable script, and the like. Accordingly, a network-accessible service may comprise one or more computing devices, datastores (e.g., databases, non-transitory computer-readable storage media, directories, and the like), communication interfaces, and other hardware and/or software components.

Users may access a network-accessible service using a computing device, such as a personal computer, a Personal Digital Assistant (PDA), a kiosk, a cellular phone, a hand-held computer, a notebook computer, a netbook, a tablet computer, or the like. User access may be provided via any communication mechanisms known in the art including, but not limited to: a Transmission Control Protocol/Internet Protocol (TCP/IP) network (e.g., the Internet), a Local Area Network (LAN), a Wide Area Network (WAN), a Virtual Private Network (VPN), a Public Switched Telephone Network (PSTN), a wireless network (e.g., radio, IEEE 802.11, a cellular network), a combination of networks, and so on. A network-accessible service may be available to the general public or may be private (e.g., accessible to a predetermined set of users).

In some embodiments, a network-accessible service may provide content to users via the communication network. The content may be adapted for various computing devices and/or applications as described above (e.g., browser application, handheld device, etc.). The content may comprise and/or be implemented using any user-interface mechanism known in the art, including, but not limited to: HTML, Virtual Reality Modeling Language (VRML), text (e.g., TELNET), audio, video, executable code (e.g., ADOBE FLASH®), may include accessibility features (e.g., a11y interface features), and so on. Alternatively, or in addition, the content may be configured to interact with one or more dedicated, client application(s), which may be special purpose applications installed on a user computing device and/or operating as plug-ins to other applications (e.g., operating as a browser application plug-in, an applet (or "app"), or the like).

In some embodiments, a network-accessible service may be implemented as a website (a computing system comprising one or more server computing devices). The website may be configured to provide content in a browser-renderable format, such as HTML. However, as discussed above, the disclosure is not limited in this regard and could be adapted to use any content delivery technique known in the art.

The network-accessible service may provide advertising content along with the content it provides to users. The advertising content may be selected by the network-accessible service itself and/or may be provided by third parties, such as affiliates, advertisers, advertising networks, or the like. The advertising content may include any content type known in the art (e.g., text, images, video, audio, multimedia, user interface elements, etc.).

In some embodiments, advertising content may be included with the content provided by the network-accessible service (e.g., above, below, and/or interspersed with the content). The advertising content may comprise a "popup" that overlays other content, is in-line with the content, or the like. Alternatively, or in addition, the advertising content may be presented interstitially (e.g., displayed before and/or after other content). Advertising content may be provided within markup-language (e.g., web pages) and/or content-presentation applications (e.g., a portion of the viewable area of an "app" provided by the network-accessible service may be used to display advertising). As would be appreciated by one of skill in the art, the teachings of this disclosure could be applied to any type of advertising space and/or advertising mechanism known in the art.

An advertising provider may select the advertising content to be displayed via the network-accessible service. In some embodiments, the advertising provider may "target" advertising to users. For example, the advertising provider may maintain and/or access user-profile information, which may be used to select advertising content that is likely to be relevant to the user. Various mechanisms for aggregating user profile information are described in co-pending application Ser. No. 12/243,855, entitled, "Systems and Methods for Aggregating User Profile Information in a Network of Affiliated Websites," filed Oct. 1, 2008, which is hereby incorporated by reference in its entirety. Alternatively, or in addition, the advertising provider may consider a "context" of the user to select advertising content. As used herein, a "context" refers to the type of content the user is accessing on the network-accessible service, the user's content viewing history, or the like.

In some embodiments, the advertising provider may pay for the opportunity to include its advertising content to users.

For example, the advertising provider may "bid" (indicate an amount it is willing to pay) for an impression. The decision of whether to pay for an advertising impression and/or the amount to bid for an impression may be based upon the degree to which the advertising provider can tailor content to the user. For instance, the advertising provider may be unwilling to purchase and/or pay for an advertising impression unless a local dealer of the user can be identified.

The advertising provider may wish to provide advertising content that provides specific information about a product or service, such as dealer locations, current inventory, and so on (e.g., local advertising). However, contractual obligations (or other restrictions) may preclude the use of local advertising. For example, an Original Equipment Manufacturer (OEM) or franchisor business entity may advertise products or services that are provided by subordinate entities (e.g., dealers or franchises), each of which may be assigned its own "area of responsibility" (AOR). The top-level business entity (e.g., the OEM or franchisor) may be obligated to deliver potential customers to the correct business entity in accordance with the subordinate entity AORs. However, advertising content that is accessible via a network may be accessed by users in many different AORs, and as such, local advertising content may be precluded.

As used herein, an "OEM" or "franchisor" refers to a business entity that produces a product and/or offers services that may be offered, sold, serviced, and/or maintained by one or more subordinate business entities (e.g., "dealers" or "franchises"). As used herein, a "dealer" or "franchise" refers to a business entity that offers services, sells products, provides services and/or maintenance under an upper-level business entity, such as an OEM or franchisor. Moreover, although the terms "OEM," "franchisor," "dealer," and/or "franchise" are used herein, the disclosure is not limited in this regard and could be adapted for use with any business organization and/or structure known in the art.

FIG. 1A depicts one embodiment of a business organization 100 comprising a top-level business entity (e.g. OEM) 110 and a plurality of subordinate entities 120 and 130. Although FIG. 1A shows a three-tier franchise business organization 100, one skilled in the art would recognize that the teachings of this disclosure could be used with virtually business organization comprising any number of tiers and/or structure (e.g., multi-tiered, flat, or the like).

The OEM 110 may represent the top-level business entity in the organization 100. The OEM 110 may be an OEM who manufacturers products (e.g., vehicles) that are sold and/or serviced through a dealer network. Accordingly, the subordinate business entities 120 and 130 may represent franchise groups 120 (e.g., dealer groups) and individual franchises 130 (e.g., dealers), which sell and/or service the franchisor's products. In other embodiments, the OEM 110 may be a service provider, such as an accounting services provider, or the like, and the subordinate business entities 120 and/or 130 may be franchises that provide the services under the direction and/or supervision of the OEM 110.

The business organization 100 may comprise a plurality of franchises 130A-G, which may sell, support, and/or provide services under the OEM 110. The business organization 100 may comprise one or more franchise groups 120A-B, which may be business entities that represent regional associations and/or groups of franchises 130A-G (e.g., the franchises 130 under a particular group 120 may be commonly owned and/or controlled).

Each of the dealers 130 and/or dealer groups 120 may be assigned a respective AOR, and the OEM 110 may be obligated to configure advertising to deliver potential customers to the appropriate dealer 130 and/or dealer group 120. Similarly, a dealer group (e.g., group 120A) may be obligated to configure its advertising to deliver potential customers to the appropriate group dealer 130A, 130B, or 130C (per the dealer AORs or other contractual arrangements). Accordingly, the OEM 110 may be obligated to ensure that its advertising content that includes dealer-specific content (e.g., dealer name, contact information, etc.) and is provided to users in the correct AOR; users in the AOR of dealer 130A should not be provided with dealer-specific advertising content of dealer 130D.

FIG. 1B graphically depicts a datastructure comprising a plurality of AORs, each being assigned a respective business entity (e.g., dealer). The AORs depicted in FIG. 1B may be arranged by markets or regions. An area or region (e.g., the United States) may be segmented into any number of markets. In the FIG. 1B example, a market 101 may comprise AORs within the Seattle metro area, and the market 103 may comprise AORs within the Dallas-Fort Worth metro area (not shown). Although FIG. 1B shows the AORs for a single market 101, one of skill would recognize that the datastructure depicted in FIG. 1B could include any number of AORs within any number of different markets and/or regions.

In the Seattle market 101, the area 131A may be the AOR of the dealer 130A, the area 131B may be the AOR of the dealer 130B, the area 131E may be the AOR of the dealer 130E, the area 131F may be the AOR of the dealer 130F, and the area 131G may be the AOR of the dealer 130G. In some embodiments, the AORs 131A, 131B, 131E, 131F, and 131G may correspond to predefined regions, such as zip codes regions, postal codes, counties, neighborhoods, proper names, or the like. Accordingly, the AORs 131 may be more finely grained than state, city, and/or country location information. Although not shown in FIG. 1B, in some embodiments, the AORs of two or more dealers may overlap one another. Accordingly, a user in a particular location (e.g., zip code) may be within the AOR of two or more dealers. In this case, the selection of which dealer is assigned to the user may be selected randomly, may be rotated (e.g., the dealers may be selected in a "round-robin" scheme, or the like). In some embodiments, the AORs may not completely cover a particular area (e.g., a user may not be within the AOR of any dealer). The dealer assigned to such a user may be selected as the nearest dealer, the nearest AOR, by contract or other agreement, or the like.

As discussed above, a top-level business entity (e.g. OEM 110) may be obligated to confirm advertising content to the AOR boundaries of its subordinate entities (e.g., dealers 130). Accordingly, the OEM 110 may be obligated to configure its advertising to direct users in the market 101 to the appropriate dealer (per the dealer AORs depicted in FIG. 1B). As such, advertising content presented to a user located at point 140 may comprise information pertaining to the dealer 130B (or dealer group 120A to which the dealer 130B belongs), since the point 140 is located within its AOR 131B. A user located at a different point 141 may be presented with local advertising content pertaining to a different dealer (e.g., dealer 131F).

As illustrated in FIG. 1B, the AORs 131 may be finely grained. For instance, the Seattle market area 101 may be covered by a plurality of AORs 130. The AORs may be defined in terms of postal or zip code (or by street address or neighborhood). The city of Seattle itself may be covered by several of the AORs 131. Accordingly, identifying the AOR associated with a particular user may require specific location-identifying information; merely identifying the user's country, state, or city may not be sufficient.

As such, techniques for estimating the location of a user based upon the user's network address (e.g. Internet Protocol (IP) address) may not be viable. Such techniques may have limited accuracy (e.g., may not provide location information with sufficient specificity to determine the appropriate dealer AOR), may be easily (or unintentionally) spoofed (e.g., by the use of a proxy, remote ISP, etc.), and/or may not provide location information on a "real-time" basis. Moreover, a user may move from place to place, whereas his true "home" location remains the same; therefore, location-identifying information derived from a network address may not truly reflect the user's home location.

In some embodiments, user location may be determined using information provided by the user himself and/or through other user activity. As will be described below, location-identifying information, may be acquired using a number of different techniques including, but not limited to: accessing location information provided by the user; accessing location information provided by the user to a different network-accessible service (e.g., in a previous session); obtaining location information from an advertising network; obtaining location information from a third-party service; obtaining location information from a user device (e.g., a location-aware smart phone having GPS functionality), obtaining location information from a network service (e.g., Internet Service Provider, wireless network node, cell tower, IP-address lookup, etc.), or the like. As used herein, location-identifying information refers to any information used to determine a location of a user. Accordingly, location-identifying information may include, but is not limited to: location coordinates (e.g., latitude and longitude, GPS coordinates, etc.), a postal code, a zip code, a proper name, a country code, a state identifier, a province identifier, a regional identifier (e.g., county, municipality, etc.), a street address, or the like.

When the location of the user is determined, the advertising provider may identify the business entity (e.g., dealer) that is "assigned" to the user per the dealer or franchise agreement(s). The identification may comprise comparing the user's location to an AOR datastructure, such as a map datastructure as illustrated in FIG. 1B. Once the AOR is identified, advertising content generated for the user may be customized to include localization information pertaining to the identified business entity (e.g., dealer-specific content). If no location information is available (or is insufficient to identify one or more AORs), the user may be provided with "generic" advertising content, which may include a prompt to provide location-identifying information. Accordingly, the advertising provider may provide targeted advertising while conforming to its advertising obligations.

Figure 2:
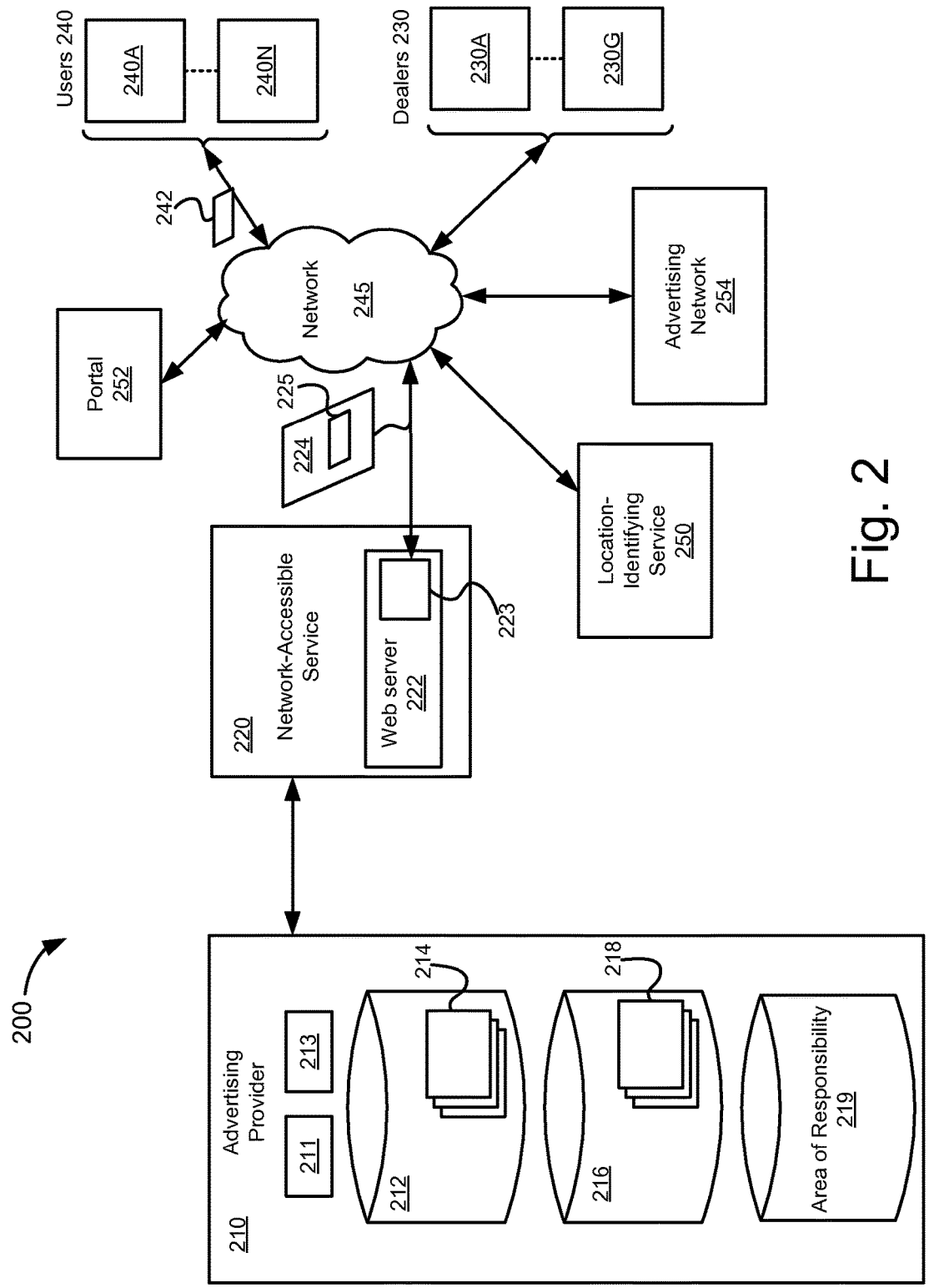
FIG. 2 depicts a system comprising an advertising provider configured to provide targeted advertising.

FIG. 2 is a system diagram of one embodiment of a system 200 for providing entity-specific advertising content while conforming to advertising obligations. The system may include a network-accessible service 220, which, in the FIG. 2 example, may be and/or comprise a web server 222. The web server 222 may comprise a Content Adaptive Website capable of customizing content based upon user profile information as described in the following co-pending applications: application Ser. No. 12/243,852, entitled, "Systems and Methods for Configuring a Website Having a Plurality of Operational Modes," filed on Oct. 1, 2008; and application Ser. No. 12/243,861, entitled, "Systems and Methods for Configuring a Network of Affiliated Websites," filed Oct. 1, 2008, each of which is hereby incorporated by reference in their entirety.

The network-accessible service 220 may be configured to receive requests for content from users 240 via a network 245, and to respond by providing the requested content using any communication and/or content presentation mechanism in the art. The content 224 provided to a user 240A (responsive to a content request 242 from the user 240A) may comprise advertising content 225. The advertising content 225 may be provided by the network-accessible service 220, an advertising network 254, and/or an advertising provider 210.

The advertising provider 210 may be configured to generate dealer-targeted advertising content for the network-accessible service 220 (e.g., to be used as advertising content 225 provided to the users 240). The advertising provider 210 may be implemented using a computing device, which may comprise a processor 211, memory 213, and so on. Accordingly, in some embodiments, the advertising provider 210 may be implemented using the processor 211 and memory 213, and as such, may comprise one or more software modules embodied as machine-readable instructions stored on a non-transitory computer-readable storage medium, such as a disc, non-volatile memory, or the like. The advertising provider 210 may further comprise and/or be coupled to communication interfaces (not shown), input-output devices (not shown), and the like.

In some embodiments, the advertising provider may comprise a datastore 212 comprising advertising templates (e.g., advertising template 214), and a datastore 216 comprising dealer-specific advertising content (dealer-specific content records 218). An advertising template 214 may comprise generic advertising assets promoting a particular product or service of the OEM (or franchisor), into which dealer-specific advertising content may be included. The template 214 may include tags or call-outs (or other template entry fields) identifying locations in the template that are configured to receive dealer-specific content (from the datastore 216). The datastores 212 and/or 216 may comprise a database, disc, non-volatile memory, or the like. In some embodiments, a dealer specific content may comprise an eXtensible Markup Language (XML) file comprising and/or referencing generic advertising assets. XML elements within the template may indicate where dealer-specific content may be included. The XML elements may further specify the type(s), sizing, and other parameters of the dealer-specific content (e.g., may specify the inclusion of a "small" logo, inventory data (text), and so on). The advertising provider 210 may be configured to interpret the XML elements and associated directives when combining an advertising template with dealer-specific content.

The datastore 216 may comprise dealer-specific advertising content 218, which may be combined with the advertising templates of the datastore 212 to generate dealer-targeted advertising content. The dealer-specific advertising content may include, but is not limited to: dealer branding assets (e.g., dealer logo and other graphics), dealer contact information (e.g., street address, phone, email, etc.), dealer inventory status (e.g. real-time inventory), dealer-specific offers, services provided at the dealer, wait times, personnel availability, any/or any other dealer-specific content. Accordingly, in some embodiments, the contents of the datastore 216 may be acquired from the dealers 230A-230G (e.g., the datastore 216 may be communicatively coupled to inventory and/or service management systems (not shown) of the dealers 230A-230G). Alternatively, or in addition, the advertising provider 110 may bypass the datastore 216 to access dealer-specific information directly from the dealers 230A-230G.

The advertising provider 210 may be configured to generate dealer-targeted advertising content, which may be returned with content 224 provided by the network-accessible service 220 in response to a user request, such as the content request 242. When the content request 242 is received, the advertising provider 210 may attempt to access location-identifying information corresponding to the content request 242 (and/or user 240A associated therewith). As described above, the location-identifying information may be sufficiently specific (e.g., a zip code or street address) to allow the advertising provider 210 to identify an AOR. In some embodiments, the advertising provider 210 may pay the network-accessible service 220 (or advertising network 254, etc.) for the opportunity to provide advertising content to the users 240. The advertising provider 210 may determine whether to pay for an advertising impression (or determine the price to pay for the impression) based upon whether location-identifying information is available. If location-identifying information sufficient to generate dealer-targeted advertising is available and/or user profile information indicates that the user is "in-market," the advertising provider 210 may pay for an advertising impression (or be willing to "bid" more for the impression), whereas if no location-identifying information is available, the advertising provider 210 may forego the advertising impression or bid a lesser amount.

The advertising provider 210 may access the location-identifying information using a number of techniques including, but not limited to: accessing location-identifying information provided by the user 240A, accessing location-identifying information provided by the user 240A to a different network-accessible service (e.g., in a previous session), obtaining location-identifying information from an advertising network 254, obtaining location-identifying information from a third-party service 250, or the like.

In some embodiments, users 240 accessing the network-accessible service 220 may be prompted to provide registration and/or profile information. This information may be provided when a user 240 first accesses the service 220 and/or may be updated on an ongoing basis (e.g., by prompting the users 240 and/or observing activity on the service 220). For example, the network-accessible service 220 may provide location-targeted content, which may be accessible only when users 240 provide location-identifying information. The location-identifying information may be received in a number of different ways including, but not limited to: the user entering location-identifying information, the user interacting with a map or other interface element, the user accessing the network-accessible service 220 using a location-aware device (e.g., a mobile communication device having GPS functionality), the user accessing other, location-aware network accessible services, or the like.

The location-identifying information provided by a user 240 may be stored in a browser "cookie" or other datastore 223 maintained by the network-accessible service 220. The cookie and/or profile datastore 223 may be accessible by the advertising provider 210. Alternatively, or in addition, the content request 242 may include a session identifier (or persistent session identifier header, an authentication header, a cookie, or the like), which may be used to access a user profiling maintained by the network-accessible service 220 (e.g., in the profile datastore 223). Other persistent user profile datastores may be queried, such an ADOBE FLASH® local shared object, cross-domain cookies, browser session data, a user identifier (e.g., user name, email address, etc.), or the like.

In some embodiments, the advertising provider 210 may access location-identifying information that was provided by the user 240A to a different network-accessible service, such as a portal website 252. The portal website 252 may be a product research website (e.g., an automotive research website, such as AUTOTRADER®, EDMUNDS®, or the like). The portal website 252 may request location-identifying information from users 240 to better provide location-targeted research information. The portal 252 may be configured to provide such information to the advertising provider 210 (subject to certain privacy restrictions). The location-identifying information may be provided using HTTP headers (e.g., in an HTTP forward or other referral mechanism), using cross-domain cookies, by back-channel communication between the advertising provider 210 and portal 252, using a profile aggregation service (not shown), or the like.

The advertising provider 210 may participate and/or be a member of an advertising network 254, which may maintain user profile data for members of the network. The user profile data maintained by the advertising network 256 may comprise location-identifying information entered at other network-accessible service(s) associated with the advertising network 254 (e.g., in previous sessions). As will be described below, the advertising network 254 may also be leveraged to identify users that are "in-market" (e.g., preparing to purchase a product advertised by the advertising provider 210), determine product preferences of the users (e.g., identify the type(s) of products and/or product features in which the user may be interested), and the like.

In some embodiments, the advertising provider 210 may be communicatively coupled to a third-party location-identification service 250, which may be configured to provide location-identification information regarding the users 240 using one or more of the techniques described above. The location-identification service 250 may comprise and/or be communicatively coupled to a plurality of different network-accessible services (not shown), each of which may use the service 250 to aggregate and/or access user profile information, including, but not limited to user location-identifying information. For example, when one of the network-accessible services (e.g., service 220) receives location-identifying information from a user 240, the information may be provided to the third-party service 250 (along with a key or other user identifier). Other network-accessible services (not shown) may be given access to the location-identifying information for use with certain restrictions (e.g., per a privacy policy of the advertising provider 210 and/or location-identification service 250).

Once location-identifying information regarding the content request 242 is obtained (using one or more of the techniques described above), the advertising provider 210 may determine the dealer 230 (and/or dealer group) that is assigned to the user 240A (e.g., identify the dealer 230 that is assigned the AOR in which the user 240A is located). In some embodiments, the advertising provider 210 may compare the location-identifying information to a dealer-to-AOR datastructure 219, which may comprise a datastructure as depicted in FIG. 1B (e.g., location-to-AOR mappings between locations and dealers).

If one or more dealers are identified, these dealers may be stored in a user profile (e.g., cookie) of the user 240A. Accordingly, future adverting for the user 240A may be targeted to the proper dealer without re-accessing the location-identifying information, AOR datastore 219, and the like.

The advertising provider 210 may generate dealer-targeted advertising content by combining an advertising template (e.g., template 214) from the datastore 212 with dealer-specific content obtained from the datastore 216. The resulting dealer-targeted advertising content may comprise a combination of generic advertising assets provided by the OEM (or franchisor) and dealer-specific content pertaining to the identified dealer 230. The dealer-targeted advertising generated by the advertising provider 210 may be provided to the network-accessible service 220, which may transmit the dealer-specific advertising content 225 to the user 240A. As discussed above, the dealer-specific advertising content 225 may be included with the content 224, presented to the user 240A interstitially, or the like.

In some embodiments, the datastore 212 may comprise a plurality of different advertising templates, each promoting a different type of product and/or targeted to a different "type" of customer (e.g., "in-market," "casual," "green," and so on). The advertising provider 210 may be configured to select from the different advertising templates based upon user profile information. User profile information may be determined based upon the content 224 requested by the user 240A, by the user's 240A behavior on the network-accessible service 220 (e.g., past browsing history, etc.), by the user's 240A behavior on other network-accessible services (not shown), user profile information shared by other network-accessible services (e.g., product research portals, etc.), or the like. Alternatively, or in addition, the advertising provider 210 may access a user profile datastore 223 maintained by the network-accessible service 220, advertising network 254, location-identifying service 250, or the like.

For example, the datastore 212 of an advertising provider 210 for a vehicle manufacturer may include advertising templates related to "work" vehicles (e.g., trucks), "family" vehicles (e.g., mini vans, sport utility vehicles, etc.), "green" vehicles (e.g., hybrids, etc.), and so on. The advertising provider 210 may be configured to select a template from the datastore 212 based upon the user profile information accessed as described above. For instance, if the user profile information indicates that the content request 224 pertains to environmental issues, the user 240A has accessed content related to the environment in previous sessions, or the like, the advertising provider 210 may select an advertising template promoting "green" vehicles. The selected advertising template may be used to generate dealer-targeted advertising using dealer-specific content from the datastore 216 as described above.

The dealer-targeted advertising may be generated upon request (e.g., in response to the content request 242) and/or may be pre-generated and stored in a datastore 212 or 216. The advertising provider 210 may pre-generate advertising content for a user (e.g., user 240A) as soon as location-identifying information about the user is available. An indicator referencing the pre-generated advertising content may be stored in a user profile for the user (e.g., cookie or the like). The pre-generated advertising content may be provided when a content request from the user is received.

If the advertising provider 210 is unable to access location-identifying information for the user 240A, the advertising provider 210 may generate "generic" advertising content. The generic advertising content may not include dealer-specific advertising content. In some embodiments, generic advertising content may comprise a prompt requesting location-identifying information from the user 240A (e.g., "enter your zip code"). Alternatively, the prompt may comprise a request for user approval to access location-identifying information stored on the user's computing device, from a location-aware computing device, or the like. When the user 240A provides location-identifying information, the advertising provider 210 may generate updated, location-targeted, advertising content as described above.

Figure 3:
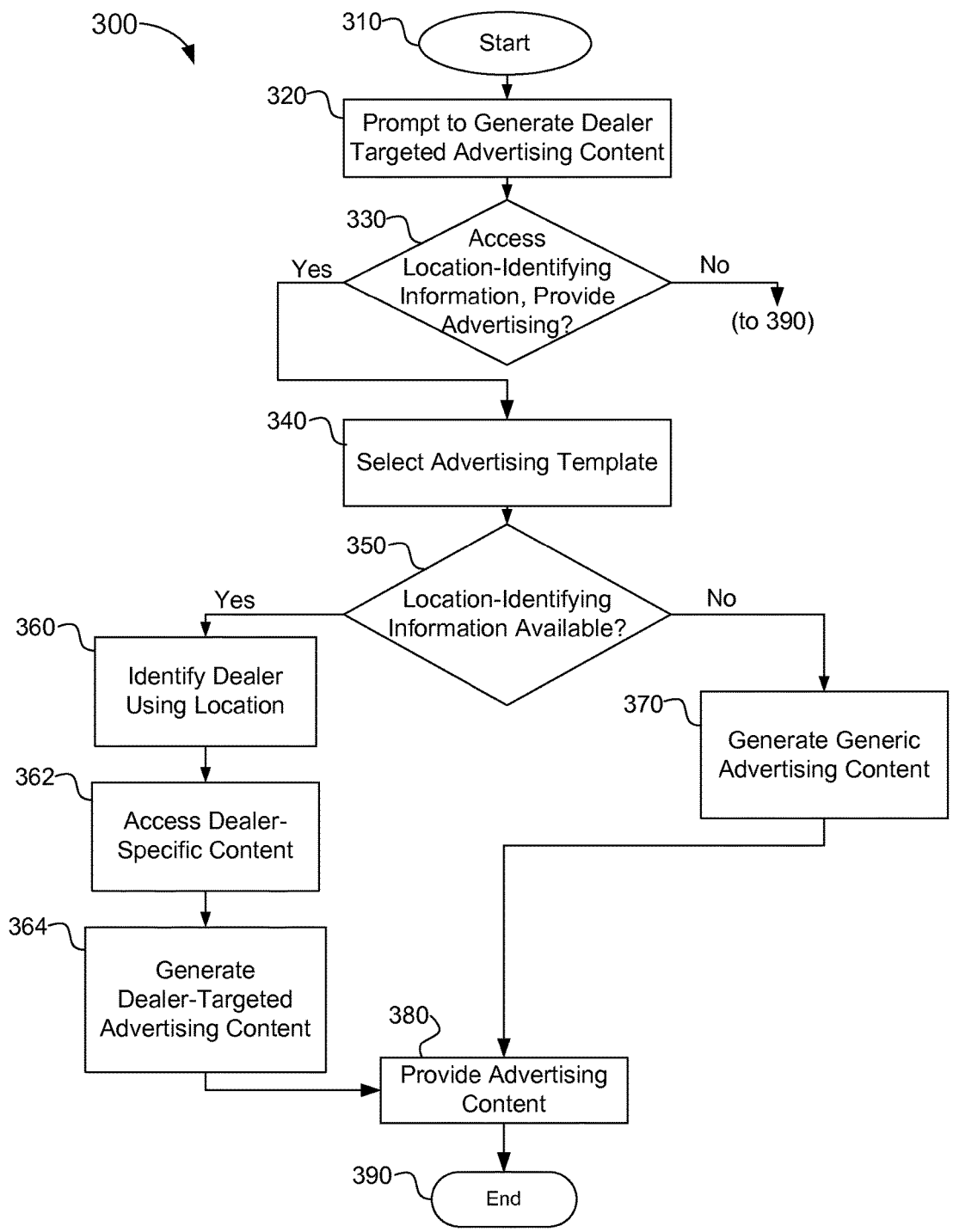
FIG. 3 is a flow diagram of one embodiment of a method for providing targeted advertising.

FIG. 3 is a flow diagram of one embodiment of a method 300 for providing targeted advertising. In some embodiments, one or more steps of the method 300 may be implemented using machine-readable instructions stored on a non-transitory computer-readable storage medium (e.g., disc, non-transitory memory, etc). The instructions may be executed by a machine (e.g., computing device) to implement one or more steps of the method 300.

At step 310, the method 300 may start and be initialized, which may comprise loading one or more machine-readable instructions from a non-transitory computer-readable storage medium, initializing hardware resources (e.g., datastores, communication interfaces, etc.), and so on.

At step 320, the method 300 may be prompted to generate dealer-targeted advertising content to be displayed in connection with content provided by a network-accessible service may be received. In some embodiments, the prompt may be received in response to a user content request (e.g., HTTP request). The content request may be received over a network (e.g., the Internet), and may comprise an HTTP request (e.g., HTTP GET), or other request type. The content request may comprise source-identifying information, such as a source IP address, request headers (e.g., HTTP headers), session identifiers, user credentials, and so on. In some embodiments, the prompt may comprise an offer to purchase an advertising impression and/or to bid on the impression.

At step 330, location-identifying information regarding the request may be accessed. The location-identifying information accessed at step 330 may be of sufficient specificity to allow the method 300 to assign a dealer to the request. Accordingly, the location-identifying information may comprise a dealer identifier (stored in a previous iteration of the method 300), an indicator identifying pre-generated advertising content, a postal code, a zip code, proper name, a street address, or the like. As described above, accessing location-identifying information at step 330 may comprise: accessing location-identifying information provided by the requester (and maintained by the method 300 or network-accessible service using a cookie or another storage technique), accessing location-identifying information provided to another network-accessible service (e.g., in a previous session), accessing location-identifying information from an advertising network, obtaining location-identifying information from a third-party location service, or the like. Accordingly, in some embodiments, step 330 may comprise extracting a key (or other identifier) from the request, and using the key to query a datastore (or other network-accessible service, advertising network, or the like) for location-identifying information.

Step 330 may further comprise accessing user-profile information, which, as described above, may be used to select an advertising template that is tailored to the "interests" of the user and/or may identify products and/or services that are likely to be of interest to the user.

In some embodiments, step 330 may comprise determining whether to purchase the advertising impression and/or calculating an amount to bid on the impression. If location-identifying information is not available, the method 300 may determine that it is not worthwhile to purchase the impression; and as such, may forego providing the advertising content and/or may bid a reduced amount for the impression. Conversely, if location-identifying information is available, the method 300 may purchase the impression and/or may bid a higher amount. The determination may be based not only on the availability of location-identifying information, but also on user profile information, such as whether the user is "in-market," or the like. If the method 300 determines to forego the impression and/or the bid for the impression is not accepted, the flow may terminate at step 390 until a next prompt is received at step 320; otherwise, the flow may continue to step 340.

At step 340, one of a plurality of advertising templates stored in a template datastore may be selected. The selection may be based upon the type and/or nature of the content with which the advertising content is to be displayed. For instance, if the advertising content is to be displayed in connection with an article on farming, the method 300 may select an advertising template promoting a vehicle manufacturer's work truck line. Alternatively, or in addition, the selection may be based upon the user-file information (if available) accessed at step 330. As described above, user-profile information may be indicative of the user's interests and/or "in-market" status, which may be taken into consideration when selecting an advertising template at step 340.

At step 350, if the method 300 was able to access location-identifying information at step 330, the flow may continue to step 360; otherwise, the flow may continue to step 370.

At step 360, the method 300 may determine which of a plurality of dealers is associated with the request. Accordingly, step 360 may comprise determining in which dealer AORs the location-identifying information falls. The determining may comprise accessing an AOR datastructure (e.g., map datastructure) or the like. Once the AOR is determined, the corresponding dealer or dealer group may be identified.

At step 362, the method may access dealer-specific advertising content of the identified dealer or dealer group. The dealer-specific advertising content may be stored in a datastore of the method 300 and/or may be accessed directly from the identified dealer. The dealer-specific advertising content may comprise dealer location information (e.g., address, directions, etc.), contact information, branding assets (e.g., logo, color scheme, etc.), offers available at the dealer, dealer inventory information (e.g., real-time inventory available at the dealer), products or services offered at the dealer, coupons, etc.

At step 364, the method 300 may generate dealer-targeted advertising content by combining the advertising template selected at step 340 with the dealer-specific content accessed at step 362. The combining may comprise identifying tags or other "call-outs" in the advertising template specifying where dealer-specific content may be inserted. The method 300 may identify and/or interpret the tags, obtain the requested content (from a datastore and/or directly from a dealer), and insert the content into the template. For example, an advertising template may include a tag specifying the placement of dealer branding information (e.g., a logo image). At step 364, the method 300 may identify the tag(s) or call-out(s) in the advertising template, access dealer-specific content corresponding to the tag(s) or call-out(s), and insert appropriate dealer-specific content to generate dealer-targeted advertising content. In another example, a tag or callout may call for "real-time" information from a dealer, such as a service wait time, inventory status, or the like. The method 300 may query the dealer for the requested information (e.g., via a communication link, database query, or the like) and may populate the template accordingly. In some embodiments, the method 300 may include a refresh process during which each dealer and/or dealer group is queried for updated dealer-specific content. These queries may be configured to occur during "off-peak" times to prevent interference with the dealers' normal operations. The updated information accessed during the refresh may be stored (e.g., in a datastore, such as the datastore 216 of FIG. 2) and used to provide up-to-date dealer-specific information.

At step 370, if no location-identifying information is found (or if the location is not sufficiently specific to identify a dealer AOR), the method 300 may generate "generic" advertising content. The generic advertising content may not include dealer-specific content. The generic advertising content may include a prompt for location-specific information (e.g., a zip code entry field). When location-identifying information is provided via the entry field, the flow may continue at step 360, where updated, dealer-specific advertising content may be generated as described above.

At step 380, the method 300 may provide the advertising content generated at steps 360-364 and/or 370 to the requester of step 320. At step 390, the method 300 may end until another prompt to generate dealer-specific advertising content is received.

The above description provides numerous specific details for a thorough understanding of the embodiments described herein. However, those skilled in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the Drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a non-transitory computer-readable medium having stored instructions thereon that may be used to program a computer (or other electronic device) to perform processes described herein. The non-transitory computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory and/or other data storage device. A software module may, for instance, comprise one or more physical or logical blocks of computer instructions, which may be organized as a routine, program, object, component, data structure, etc., that perform one or more tasks or implements particular abstract data types. The instructions may be stored on a non-transitory computer-readable storage medium, and may be loaded into a memory when needed.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention.

We claim:

1. A method for serving location-specific advertising content within an electronic communication network, comprising:

maintaining on a computer-readable storage medium, an area of responsibility (AOR) data structure defining a plurality of AOR and a plurality of geographical areas covered by the electronic communication network, each AOR corresponding to a respective geographical area defined in the AOR data structure and being associated with respective AOR-specific electronic content;

embedding customization tags within electronic markup data of one or more advertising templates, the customization tags configured to provide for generating AOR-specific advertising content customized for each AOR of the plurality of AOR defined in the AOR data structure from a same advertising template; and providing advertising content in response to each request of a plurality of requests received at a computing system through the electronic communication network, the requests corresponding to respective client computing devices at physical locations within geographical areas of a plurality of different AOR defined in the AOR data structure, the providing comprising:

the computing system using the AOR data structure to generate customized, AOR-specific advertising content for each request of the plurality of requests from the same advertising template, the generating comprising:

the computing system determining location-identifying information for each request of the plurality of requests, the location-identifying information determined for each request comprising electronic data indicating a physical location of a respective client computing device corresponding to each request, the computing system using the AOR data structure to identify AOR-specific electronic content to include in the customized, AOR-specific advertising content generated for each request, the identifying comprising matching the location-identifying information determined for the requests to respective geographical areas of AOR defined in the AOR data structure and accessing the AOR-specific electronic content associated with the matching AOR, the computing system generating the customized AOR-specific advertising content for each request of the plurality of requests from the same advertising template, by inserting the AOR-specific electronic content identified for each request into the electronic markup data of the same advertising template at locations identified by the customization tags embedded within the electronic markup data, and the computing system transmitting the customized, AOR-specific advertising content generated for the plurality of requests to the respective client computing devices corresponding to each request through the electronic communication network.

2. The method of claim 1, wherein matching the location-identifying information determined for a first one of the requests to a geographical area comprises determining that the location-identifying information determined for the first request falls within the geographical area.

3. The method of claim 1, further comprising:
matching location-identified information determined for a first request to two or more AOR of the AOR data structure; and
selecting one of the two or more AOR in accordance with a round-robin selection scheme.

4. The method of claim 1, wherein the requests correspond to respective client content requests, the method further comprising selecting the advertising template from a plurality of advertising templates based upon one or more of the client content requests and user profiles associated with the client content requests.

5. The method of claim 1, wherein the location-identifying information determined for a first one of the requests comprises one or more of a postal code, a zip code, a proper name, location coordinates, and a street address.

6. The method of claim 1, wherein the AOR-specific electronic content associated with a first AOR defined in the AOR data structure comprises an indicator of an inventory available at a particular dealer associated with the first AOR.

7. The method of claim 1, wherein the AOR-specific electronic content associated with a first AOR defined in the AOR data structure comprises one or more of an address of a particular dealer associated with the first AOR, contact information of the particular dealer, a wait time at the particular dealer, and an offer available from the particular dealer.

8. The method of claim 1, further comprising generating generic advertising content in response to a request for which location-identifying information is not available.

9. The method of claim 1, wherein determining the location-identifying information for a first one of the requests comprises one or more of accessing location-identifying information stored using a browser application, accessing location-identifying information in a header of the first request, accessing location-identifying information in a header of a content request associated with the first request, retrieving location-identifying information from a user profile associated with the first request, accessing location-identifying information maintained by a network-accessible service, and accessing location-identifying information maintained by an advertising network.

10. A system for delivering location-aware advertising content in an electronic communication network, comprising:
a non-transitory computer-readable storage medium comprising:

an area of responsibility (AOR) data structure defining a plurality of geographical areas, each geographical area corresponding to a respective AOR and being associated with respective AOR-specific electronic content, and one or more advertising templates, each advertising template comprising embedded customization tags configured to provide for generating AOR-specific advertising content customized for each AOR of the plurality of AOR defined in the AOR data structure from a same advertising template;

a server comprising a processor; and an advertising provider operating on the processor of the server, the advertising provider configured to service a plurality of requests for advertising content in response to receiving the requests through the electronic communication network, wherein servicing the plurality of requests comprises the advertising provider:

determining location-identifying information for each request for advertising content, the location-identifying information determined for each request comprising electronic data indicating a physical location of a client computing device corresponding to each request, using the AOR data structure to identify AOR-specific electronic content for each request, the identifying comprising matching the location-identifying information determined for each request to a geographical area of an AOR defined in the AOR data structure and accessing the AOR-specific electronic content associated with the matching AOR, generating AOR-specific advertising content for each advertising content request from an advertising template selected from the one or more advertising templates, the generating comprising inserting the AOR-specific electronic content identified for each advertising content request into the selected advertising template at locations identified by the embedded customization tags of the selected advertising template, and transmitting the AOR-specific advertising content generated for the requests via the electronic communication network for display on the client computing devices corresponding to the requests.

11. The system of claim 10, wherein the advertising provider is further configured to select the advertising template from a shared template data store comprising a plurality of advertising templates, each advertising template comprising respective embedded customization tags.

12. The system of claim 10, wherein the advertising provider is further configured to select the advertising template from a shared template data store comprising a plurality of advertising templates based on one or more of content requests associated with the requests for advertising content, and user profiles associated with the content requests.

13. The system of claim 10, wherein the location-identifying information determined for a first advertising content request comprises one or more of a postal code, a zip code, a proper name, location coordinates, and a street address.

14. The system of claim 10, wherein the AOR-specific electronic content associated with a first AOR defined in the AOR data structure comprises one or more of an address of a particular dealer associated with the first AOR, contact information of the particular dealer, a wait time at the particular dealer, and an offer available from the particular dealer.

15. The system of claim 10, wherein the location-identifying information determined for a first one of the plurality of requests for advertising content comprises one or more of location-identifying information stored using a browser application, location-identifying information in a header of the first request transmitted via the electronic communication network, location-identifying information in a header of a client content request associated with the first request, location-identifying information maintained by a network-accessible service, and location-identifying information maintained by an advertising network.

16. A non-transitory computer-readable storage medium comprising machine-readable instructions to cause a machine to perform operations for distributing location-aware content within an electronic communication network, the operations comprising:

maintaining an area of responsibility (AOR) data structure defining a plurality of AOR, each AOR associated with respective AOR-specific electronic content and covering a specified geographical area;

receiving, through the electronic communication network, a plurality of requests for targeted advertising corresponding to a specified advertising template comprising electronic markup data that includes call out data identifying locations within the electronic markup data for insertion of AOR-specific content;

generating customized, AOR-specific advertising content for each request of the plurality of requests, the generating comprising:

determining location-identifying information for each request based on content requests associated with the requests, the location-identifying information comprising electronic data pertaining to physical locations of respective client computing devices associated with the requests, determining AOR-specific content for each request using the AOR data structure, the determining comprising searching the AOR data structure to match the determined location-identifying information of each request to a geographical area defined in the AOR data structure and accessing the AOR-specific content of the matching AOR, and inserting the AOR-specific content determined for each request into the electronic markup data of the specified advertising template at the locations identified by the call out data included in the electronic markup data of the specified advertising template; and transmitting the customized, AOR-specific advertising content generated for each request via the electronic communication network for display on the respective client computing devices associated with the requests.

17. The non-transitory computer-readable storage medium of claim 16, wherein the operations further comprise offering an increased bid price for advertising on a target web page associated with a particular content request based on the determined location-identifying information pertaining to the particular content request.

18. The non-transitory computer-readable storage medium of claim 16, wherein the specified advertising template is selected from a shared template data store comprising a plurality of advertising templates, each advertising template comprising respective electronic markup data including respective call out data identifying locations within the electronic markup data for insertion of AOR-specific content.

19. The non-transitory computer-readable storage medium of claim 16, wherein determining the location-identifying information for a first one of the plurality of requests comprises one or more of accessing a header of a first content request, accessing a parameter of the first content request, accessing a session corresponding to the first content request, accessing a network address of a client computing device that transmitted the first content request, and accessing a user profile corresponding to the first content request.

20. The non-transitory computer-readable storage medium of claim 16, wherein the AOR-specific content of a first AOR defined in the AOR data structure comprises one or more of a dealer inventory, a dealer promotion, a dealer group inventor, and a dealer group promotion.

\* \* \* \* \*